(12) United States Patent
Xie et al.

(10) Patent No.: US 11,442,251 B2
(45) Date of Patent: Sep. 13, 2022

(54) OPTICAL LENS ASSEMBLY AND IMAGING DEVICE

(71) Applicant: NINGBO SUNNY AUTOMOTIVE OPTECH CO., LTD., Ningbo (CN)

(72) Inventors: Qiansen Xie, Ningbo (CN); Bo Yao, Ningbo (CN); Xiang Li, Ningbo (CN)

(73) Assignee: NINGBO SUNNY AUTOMOTIVE OPTECH CO., LTD., Ningbo (CN)

( * ) Notice: Subject to any disclaimer, the term of this patent is extended or adjusted under 35 U.S.C. 154(b) by 279 days.

(21) Appl. No.: 16/730,241

(22) Filed: Dec. 30, 2019

(65) Prior Publication Data

US 2020/0166733 A1    May 28, 2020

Related U.S. Application Data

(63) Continuation of application No. PCT/CN2019/079984, filed on Mar. 28, 2019.

(30) Foreign Application Priority Data

Nov. 28, 2018    (CN) .......................... 201811431084.9

(51) Int. Cl.
*G02B 13/00*    (2006.01)
*G02B 13/18*    (2006.01)
(Continued)

(52) U.S. Cl.
CPC ....... *G02B 13/0045* (2013.01); *G02B 13/006* (2013.01); *G02B 3/02* (2013.01);
(Continued)

(58) Field of Classification Search
CPC .. G02B 13/0045; G02B 13/006; G02B 5/005; G02B 13/04; G02B 13/18; G02B 13/002; G02B 9/62; G02B 3/02
(Continued)

(56) References Cited

U.S. PATENT DOCUMENTS 3,468,600 A * 9/1969 Hugues ................. G02B 13/04
359/713
5,914,823 A * 6/1999 Yamamoto ........... G02B 13/143
359/749
(Continued)

FOREIGN PATENT DOCUMENTS

CN    104950423 A    9/2015
CN    205003346 U    1/2016
(Continued)

*Primary Examiner* — Evelyn A Lester
(74) *Attorney, Agent, or Firm* — Hauptman Ham, LLP

(57) ABSTRACT

An optical lens assembly and an imaging device including the optical lens assembly are disclosed. The optical lens assembly may include, sequentially from an object side to an image side along an optical axis, a first lens, a second lens, a third lens, a fourth lens, a fifth lens and a sixth lens. The first lens may have a negative refractive power; the second lens may have a positive refractive power; the third lens may have a positive refractive power; the fourth lens may have a negative refractive power, an object-side surface thereof is a convex surface and an image-side surface thereof is a concave surface; the fifth lens may have a positive refractive power, and both of an object-side surface and an image-side surface thereof are convex surfaces; and the sixth lens may have a negative refractive power.

20 Claims, 2 Drawing Sheets

(51) Int. Cl.
    *G02B 13/04* (2006.01)
    *G02B 9/62* (2006.01)
    *G02B 3/02* (2006.01)
    *G02B 5/00* (2006.01)
(52) U.S. Cl.
    CPC ............... *G02B 5/005* (2013.01); *G02B 9/62* (2013.01); *G02B 13/002* (2013.01); *G02B 13/04* (2013.01); *G02B 13/18* (2013.01)
(58) Field of Classification Search
    USPC .............. 359/714, 740, 752, 756, 761, 713
    See application file for complete search history.

(56) References Cited

U.S. PATENT DOCUMENTS

| | | | | |
|---|---|---|---|---|
| 7,830,620 | B2* | 11/2010 | Asami | G02B 13/04 359/761 |
| 7,903,349 | B2* | 3/2011 | Kitahara | A61P 31/14 359/794 |
| 9,405,102 | B2* | 8/2016 | Asami | G02B 13/0045 |
| 2012/0212838 | A1* | 8/2012 | Ohashi | G02B 9/04 359/713 |
| 2014/0247507 | A1* | 9/2014 | Tsai | G02B 13/18 359/713 |
| 2014/0376107 | A1* | 12/2014 | Son | G02B 13/0045 359/713 |
| 2015/0268449 | A1* | 9/2015 | Kurioka | G02B 13/0045 359/740 |
| 2015/0346461 | A1* | 12/2015 | Chen | H04N 5/2254 359/713 |
| 2015/0350503 | A1* | 12/2015 | Chen | G02B 13/0045 359/713 |
| 2016/0085055 | A1* | 3/2016 | Asami | G02B 13/04 359/755 |
| 2016/0223796 | A1* | 8/2016 | Lee | G02B 9/62 |
| 2019/0235210 | A1* | 8/2019 | Nakai | G02B 13/06 |

FOREIGN PATENT DOCUMENTS

| | | |
|---|---|---|
| CN | 105842823 A | 8/2016 |
| CN | 106199912 A | 12/2016 |
| CN | 107870408 A | 4/2018 |
| CN | 107957618 A | 4/2018 |
| CN | 207488602 U | 6/2018 |
| CN | 208737088 U | 4/2019 |
| JP | 201849188 A | 3/2018 |

* cited by examiner

OPTICAL LENS ASSEMBLY AND IMAGING DEVICE

CROSS-REFERENCE TO RELATED APPLICATION

The present patent application is a continuation of International Application No. PCT/CN2019/079984, filed on Mar. 28, 2019, which claims priority to Chinese Patent Application No. 201811431084.9, filed in the China National Intellectual Property Administration (CNIPA) on Nov. 28, 2018. Both of the aforementioned patent applications are hereby incorporated by reference in their entireties.

TECHNICAL FIELD

The present disclosure relates to an optical lens assembly and an imaging device, and more specifically to an optical lens assembly including six lenses and an imaging device.

BACKGROUND

With the rapid development of the economy, the automatic driving assistance system also continues to spread and develop rapidly. Optical lens assemblies, as one of the important components of the automatic driving system, are required to have increasingly higher performance.

Generally, the optical lens assemblies applied to a vehicle is required to have a very high performance, and the requirements for the performance of the optical lens assemblies used for automatic driving are more stringent. First of all, the optical lens assemblies are required to have higher and higher resolution. The resolution has been continuously improved from the original megapixel towards 2M, and even pursued higher resolution of 4M and 8M. Moreover, in order to improve the resolution, the total length of the system is often sacrificed, which is contrary to the trend of miniaturization of the optical lens assembly used in the automatic driving. Also, the cost is greatly increased.

In addition, in order to detect objects at long distances ahead, the field-of-view of the lens assembly shall be limited to be small, that is, in order to make the lens assembly "look" farther (i.e., have a longer focal length), the viewing range of the field-of-view angle will be reduced. Using the optical lens assembly with large field-of-view to expand the scope of visualization has become the current development trend, but at the same time it also faces enormous challenges. Moreover, high-pixel lens assemblies require a larger aperture for use in a low-light environment; a smaller CRA is needed to match the high-pixel chip without color cast.

Therefore, there is a need in the market for a high resolution optical lens assembly that combines miniaturization, large field-of-view, large aperture, small total length, and low cost.

SUMMARY

The present disclosure provides an optical lens assembly that is applicable to on-board installation and at least overcomes or partially overcomes at least one of the above deficiencies of the prior art.

In one aspect, the present disclosure provides an optical lens assembly, which may include, sequentially from an object side to an image side along an optical axis, a first lens, a second lens, a third lens, a fourth lens, a fifth lens and a sixth lens. The first lens may have a negative refractive power, and both of an object-side surface and an image-side surface thereof are concave surfaces; the second lens may have a positive refractive power, an object-side surface thereof is a concave surface and an image-side surface thereof is a convex surface; the third lens may have a positive refractive power, and both of an object-side surface and an image-side surface thereof are convex surfaces; the fourth lens may have a negative refractive power, an object-side surface thereof is a convex surface and an image-side surface thereof is a concave surface; the fifth lens may have a positive refractive power, and both of an object-side surface and an image-side surface thereof are convex surfaces; and the sixth lens may have a negative refractive power.

In an embodiment, a paraxial area of an object-side surface of the sixth lens may be convex, and the object-side surface of the sixth lens have at least one inflection point; and a paraxial area of an image-side surface of the sixth lens may be concave, and the image-side surface of the sixth lens have at least one inflection point.

In an embodiment, the fourth lens and the fifth lens may be cemented together to form a cemented lens.

In an embodiment, each of the first lens, the second lens, and the sixth lens may be an aspherical lens.

In an embodiment, each of the first to the sixth lenses may be a glass lens.

In an embodiment, a total track length TTL of the optical lens assembly and a total focal length F of the optical lens assembly may satisfy: $TTL/F \leq 7.5$.

In an embodiment, a maximum field-of-view FOV of the optical lens assembly, a maximum effective aperture radius D of the object-side surface of the first lens corresponding to the maximum field-of-view of the optical lens assembly and an image height H corresponding to the maximum field-of-view of the optical lens assembly may satisfy: $D/H/FOV \leq 0.02$.

In an embodiment, a maximum field-of-view FOV of the optical lens assembly, a total focal length F of the optical lens assembly and an image height H corresponding to the maximum field-of-view of the optical lens assembly may satisfy: $(FOV \times F)/H \geq 60$.

In an embodiment, a maximum field-of-view FOV of the optical lens assembly may be greater than or equal to 100°.

In an embodiment, a focal length F4 of the fourth lens and a focal length F3 of the third lens may satisfy: $|F4/F3| \leq 2$.

In an embodiment, a combined focal length F45 of the fourth lens and the fifth lens and a total focal length F of the optical lens assembly may satisfy: $2 \leq F45/F \leq 5$.

In another aspect, the present disclosure provides an optical lens assembly, which may include, sequentially from an object side to an image side along an optical axis, a first lens, a second lens, a third lens, a fourth lens, a fifth lens and a sixth lens. Each of the first lens, the fourth lens, and the sixth lens may have a negative refractive power; each of the second lens, the third lens, and the fifth lens may have a positive refractive power; the fourth lens and the fifth lens may be cemented together to form a cemented lens; and a total track length TTL of the optical lens assembly and a total focal length F of the optical lens assembly may satisfy: $TTL/F \leq 7.5$.

In an embodiment, both of an object-side surface and an image-side surface of the first lens may be concave surfaces.

In an embodiment, an object-side surface of the second lens may be a concave surface and an image-side surface of the second lens may be a convex surface.

In an embodiment, both of an object-side surface and an image-side surface of the third lens may be convex surfaces.

In an embodiment, an object-side surface of the fourth lens may be a convex surface and an image-side surface of the fourth lens may be a concave surface.

In an embodiment, both of an object-side surface and an image-side surface of the fifth lens may be convex surfaces.

In an embodiment, a paraxial area of an object-side surface of the sixth lens may be convex, and the object-side surface of the sixth lens have at least one inflection point; and a paraxial area of an image-side surface of the sixth lens may be concave, and the image-side surface of the sixth lens have at least one inflection point.

In an embodiment, each of the first lens, the second lens and the sixth lens may be an aspherical lens.

In an embodiment, each of the first to the sixth lenses may be a glass lens.

In an embodiment, a maximum field-of-view FOV of the optical lens assembly, a maximum effective aperture radius D of the object-side surface of the first lens corresponding to the maximum field-of-view of the optical lens assembly and an image height H corresponding to the maximum field-of-view of the optical lens assembly may satisfy: D/H/FOV≥0.02.

In an embodiment, a maximum field-of-view FOV of the optical lens assembly, a total focal length F of the optical lens assembly and an image height H corresponding to the maximum field-of-view of the optical lens assembly may satisfy: (FOV×F)/H≥60.

In an embodiment, a maximum field-of-view FOV of the optical lens assembly may be greater than or equal to 100°.

In an embodiment, a focal length F4 of the fourth lens and a focal length F3 of the third lens may satisfy: |F4/F3|≤2.

In an embodiment, a combined focal length F45 of the fourth lens and the fifth lens and a total focal length F of the optical lens assembly may satisfy: 2≤F45/F≤5.

In yet another aspect, the present disclosure provides an imaging device that may include an optical lens assembly according to the above embodiment and an imaging element for converting an optical image formed by the optical lens assembly into an electrical signal.

The present disclosure employs, for example, six lenses, and the optical lens assembly has at least one advantageous effect such as high resolution, large aperture, long focal length, low sensitivity, small CRA, a central region with large angle resolution and the like by optimizing the shape of the lens, properly distributing the refractive power of each lens and forming a cemented lens and the like.

BRIEF DESCRIPTION OF THE DRAWINGS

Other features, purpose and advantages of the present disclosure will become apparent through the detailed description of the non-limiting embodiments given in conjunction with the accompanying drawings. In the drawings.

DETAILED DESCRIPTION OF EMBODIMENTS

Figure 1:
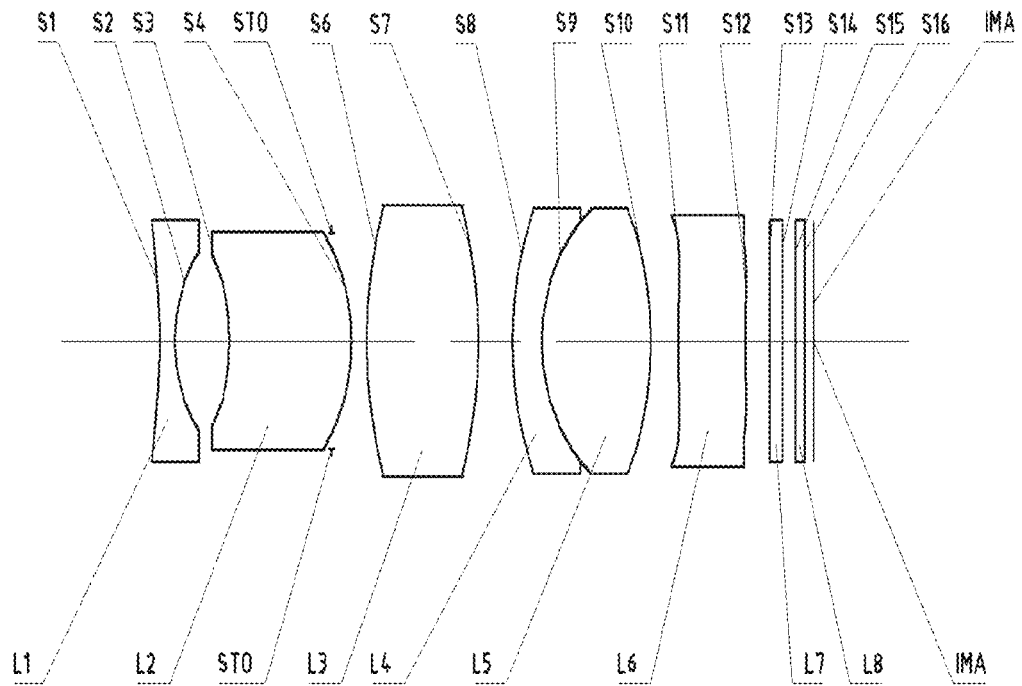
FIG. 1 is a schematic structural view illustrating an optical lens assembly according to example 1 of the present disclosure.

For a better understanding of the present disclosure, various aspects of the present disclosure will be described in more detail with reference to the drawings. It should be understood that the detailed descriptions are merely used for describing exemplary embodiments of the present disclosure, but not intend to limit the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without limiting the feature. Thus, a first lens discussed below could be referred to as a second lens or a third lens, and a first cemented lens could also be referred to as a second cemented lens without departing from the teachings of the present disclosure.

In the accompanying drawings, for convenience of explanation, thicknesses, sizes and shapes of lenses have been slightly exaggerated. Specifically, spherical or aspheric shapes shown in the accompanying drawings are shown by way of examples. That is, spherical or aspheric shapes are not limited to the spherical or aspheric shapes shown in the accompanying drawings. The accompanying drawings are merely examples, and not strictly drawn to scale.

Herein, a paraxial area refers to an area near the optical axis. If a surface of a lens is a convex surface and the position of the convex is not defined, it indicates that the surface of the lens is convex at least in the paraxial area; and if a surface of a lens is a concave surface and the position of the concave is not defined, it indicates that the surface of the lens is concave at least in the paraxial area. In each lens, the surface closest to the object side is referred to as an object-side surface; and in each lens, the surface closest to the image side is referred to as an image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to exemplary embodiments of the present disclosure includes, for example, six lenses having refractive powers, i.e., a first lens, a second lens, a third lens, a fourth lens, a fifth lens and a sixth lens. The six lenses are sequentially arranged from an object side to an image side along an optical axis.

An optical lens assembly according to exemplary embodiments of the present disclosure may further include a photosensitive element disposed on an imaging plane. Optionally, the photosensitive element disposed on the imaging plane may be a Charge-Coupled Device element (CCD) or a Complementary Metal-Oxide Semiconductor element (CMOS).

The first lens may have a negative refractive power, and both of an object-side surface and an image-side surface thereof may be concave surfaces. The first lens is designed to be a biconcave shape to achieve a central large angle resolution. The first lens is capable of collecting light within a large field of view angle into the optical system as much as possible, increasing the amount of light passing through, while advantageously achieving a large field of view. The biconcave lens may make the optical path difference between the peripheral light and the central light, diverge the central light and allow the light to enter the rear optical system, and reduce the front end aperture of the lens assembly to reduce the size, which are advantageous for miniaturization and cost reduction.

The second lens may have a positive refractive power, an object-side surface thereof may be a concave surface and an image-side surface thereof may be a convex surface. The second lens is configured to be a meniscus shape with a convex surface facing the image side, so that the light diverged by the first lens may smoothly enter the rear system, which is advantageous for correcting high-level aberrations and further mitigating the attenuation degree of the relative illumination of the lens assembly.

The third lens may have a positive refractive power, and both of an object-side surface and an image-side surface thereof may be convex surfaces. The third lens is configured to have a positive refractive power, which may quickly converge the front light within a large angle to the rear system, thereby advantageously reducing the light path at the rear end and achieving a short TTL.

The fourth lens may have a negative refractive power, an object-side surface thereof may be a convex surface and an image-side surface thereof may be a concave surface. The fourth lens is configured as a negative lens that is toward the object side, and both of the front lens and the rear lens thereof (i.e., the third lens and the fifth lens) are configured to have positive focal lengths. Such configuration may further reduce field curvature and correct the off-axis point aberration of the system.

The fifth lens may have a positive refractive power, and both of an object-side surface and an image-side surface thereof may be convex surfaces.

The sixth lens may have a negative refractive power, and the sixth lens as a whole is a meniscus lens which is convex toward the image side. Here, a paraxial area of an object-side surface of the sixth lens may be convex, and the object-side surface of the sixth lens have at least one inflection point; and a paraxial area of an image-side surface of the sixth lens may be concave, and the image-side surface of the sixth lens have at least one inflection point. The sixth lens may smoothly transmit the light passing through the fifth lens to the imaging plane to reduce the total length. At the same time, various aberrations of the optical system may be fully corrected, and in the case of compact structure, the resolution may be improved and optical properties such as distortion and CRA may be optimized.

In an exemplary embodiment, a stop for limiting the light beam may be disposed between, for example, the second lens and the third lens to further improve the imaging quality of the lens assembly. When the stop is disposed between the second lens and the third lens, the lens aperture at the front end of the lens assembly may be effectively reduced, and at the same time, a large aperture is advantageously achieved. However, it should be noted that the position of the stop disclosed herein is merely exemplary and not limiting. In an alternative embodiment, the stop may be disposed at other locations as desired.

In an exemplary embodiment, as needed, the optical lens assembly according to the present disclosure may further include an optical filter disposed between the sixth lens and the imaging plane to filter light having different wavelengths. The optical lens assembly may further include a protective glass disposed between the optical filter and the imaging plane to prevent internal components (e.g., chips) of the optical lens assembly from being damaged.

As is known to those skilled in the art, a cemented lens may be used to minimize aberration or eliminate aberration. Using a cemented lens in an optical lens assembly may improve image quality and reduce reflection losses of light energy, thereby improving the imaging sharpness of lens assembly. In addition, the use of a cemented lens may also simplify assembly process in the lens assembly manufacturing process.

In an exemplary embodiment, the fourth lens and the fifth lens can be combined into a cemented lens by cementing the image-side surface of the fourth lens with the object-side surface of the fifth lens. The cemented lens is composed of a positive lens (i.e., the fifth lens) and a negative lens (i.e., the fourth lens), wherein the positive lens (the fifth lens) has a lower refractive index, and the negative lens (the fourth lens) has a higher refractive index (compared to the positive lens). The combination of high and low refractive index may facilitate the rapid transition of the front light, increase the aperture of the stop, and meet the requirements of night vision. Using the cemented lens may help eliminate aberration, reduce field curvature, and correct coma. Placing the positive lens in front may further converge the light so as to reduce the overall TTL. Using the cemented lens may effectively reduce the system aberration, make the overall optical system compact and meet the requirements of miniaturization. Meanwhile, Using the cemented lens may reduce the tolerance sensitivity issues (such as tilt or eccentricity) of the lens unit, which otherwise will be introduced in the assembly process. In addition, if the lens at the turning point of the light is a separate lens, it is easy to increase processing/assembly errors and cause sensitivity, so the cemented lens effectively reduces the sensitivity.

In an exemplary embodiment, a total track length TTL of the optical lens assembly and a total focal length F of the optical lens assembly may satisfy: TTL/F≤7.5. More desirable, TTL/F≤7 may be further satisfied. When the conditional expression TTL/F≤7.5 is satisfied, the miniaturization of the system may be ensured.

In an exemplary embodiment, a maximum field-of-view FOV of the optical lens assembly, a maximum effective aperture radius D of the object-side surface of the first lens corresponding to the maximum field-of-view of the optical lens assembly and an image height H corresponding to the maximum field-of-view of the optical lens assembly may satisfy: D/H/FOV≤0.02. More desirable, D/H/FOV≤0.015 may be further satisfied. When the conditional expression D/H/FOV≤0.02 is satisfied, a front end small aperture may be achieved.

In an exemplary embodiment, a maximum field-of-view FOV of the optical lens assembly, a total focal length F of the optical lens assembly and an image height H corresponding to the maximum field-of-view of the optical lens assembly may satisfy: (FOV×F)/H≥60. More desirable, (FOV×F)/H≥66 may be further satisfied. When the conditional expression (FOV×F)/H≥60 is satisfied, both long focal length and large field-of-view characteristics may be achieved at the same time.

In an exemplary embodiment, a maximum field-of-view FOV of the optical lens assembly may satisfy FOV≥100° to ensure large field-of-view characteristics.

In an exemplary embodiment, a focal length F4 of the fourth lens and a focal length F3 of the third lens may satisfy: |F4/F3|≤2. More desirable, |F4/F3|≤1.5 may be further satisfied. By properly setting the focal length of the two adjacent lenses, the light may be transmitted smoothly.

In an exemplary embodiment, a combined focal length F45 of the fourth lens and the fifth lens and a total focal length F of the optical lens assembly may satisfy: 2≤F45/F≤5. More desirable, 2.5≤F45/F≤4.5 may be further satisfied. By controlling the tendency of the light between the third lens and the sixth lens, the aberration caused by the large-angle light entering through the third lens may be reduced, and at the same time, the lens structure will be compact, which may advantageously achieve the miniaturization.

In an exemplary embodiment, the first lens, the second lens, and the sixth lens in the optical lens assembly according to the present disclosure may employ aspherical lenses. Aspherical lenses are characterized by a continuous change in curvature from the center of the lens to the periphery. Unlike spherical lenses that have a constant curvature from the center of the lens to the periphery, the aspherical lenses have better radius of curvature characteristics and have the advantages of improving distortion and improving astigmatic aberration. With the aspherical lens, the aberrations that occur during imaging may be eliminated as much as possible, thereby the imaging quality of the lens may be improved. For example, the first lens may be an aspherical lens to improve the resolution of the optical system and further reduce the front end aperture. The second lens may employ an aspherical lens to improve the resolution quality. The sixth lens may be an aspherical lens to improve the resolution quality. It should be understood that, in order to improve the imaging quality, the number of aspherical lenses in the optical lens assembly according to the present disclosure may also be increased. For example, in the case of focusing on the resolution quality of the optical lens assembly, each of the first to the sixth lenses may employ an aspherical lens.

In an exemplary embodiment, the lens used in the optical lens assembly may be a plastic lens or a glass lens. Since plastic lenses have a large thermal expansion coefficient, plastic lenses will cause a greater change in the optical back focal length of the lens assembly when the ambient temperature in which the lens assembly is located changes greatly. Using glass lenses may reduce the effect on the optical back focus of the lens assembly caused by temperature, but the cost is high. In the case of focusing on the stability of the optical lens assembly, each of the first to the sixth lenses may employ a glass lens. Desirably, the first lens may be a glass aspherical lens. The use of the glass aspherical lens may improve the temperature stability of the optical lens assembly. Especially when the optical lens assembly is applied to, for example, an vehicle front-view lens assembly, the stability of the optical lens assembly under different temperature conditions is extremely demanding because the lens performance affects active safety.

The optical lens assembly according to the above-described embodiment of the present disclosure may achieve at least one of the following in performance by a reasonable lens shape configuration and refractive power configuration:

1) The center has a small angle (small field-of-view angle near the center), which makes the lens assembly have the features of the traditional front-view lens assembly (i.e. telephoto), in order to identify vehicle license plates, traffic signals and other details at a certain object distance. The entire lens assembly has the a large field-of-view (above a full angle of 120°) characteristic of a short-focus lens assembly, which may realize the function of the traditional large-angle wide-angle lens assembly to facilitate the identification of surrounding objects, provide anti-collision warning, and learn about the surrounding road conditions. At the same time, the lens assembly has the performance characteristics of long focal length and large field-of-view, so that it may directly expand the visible range when used as a forward-looking lens assembly.

2) The resolution of the image is high. On the basis of reasonable lens shape design and material matching, the glass aspherical lens is used to improve the solution.

3) The front end aperture is small, and the overall front end aperture is small. The conventional optical lens assembly capable of achieving similar performance has a larger aperture, and the front end aperture of the optical lens assembly of the present invention may be greatly reduced to 11 to 12 mm.

4) The CRA is small, which may avoid stray light caused by light emitted from the rear end and hitting the lens barrel, and may match the vehicle chip well without produce color cast and vignetting.

5) The lens assembly has a large aperture, and the imaging effect is good. The imaging quality may reach a high-definition level, and the image may be guaranteed to be clear even in the low light environment or at night.

Therefore, the optical lens assembly according to the above embodiments of the present disclosure may have at least one of the beneficial effects of high resolution, large aperture, long focal length, low sensitivity, high production yield, small CRA, a central region with large angle resolution, and the like. The optical lens assembly according to the above embodiments of the present disclosure may better match the application requirements of, for example, an on-board lens assembly.

It will be understood by those skilled in the art that the number of lenses constituting the lens assembly may be varied to achieve the various results and advantages described in this specification without departing from the technical solution claimed by the present disclosure. For example, although the embodiment is described by taking six lenses as an example, the optical lens assembly is not limited to include six lenses. The optical lens assembly may also include other numbers of lenses if desired.

Specific examples applicable to the optical lens assembly of the above embodiments will be further described below with reference to the accompanying drawings.

Example 1

An optical lens assembly according to example 1 of the present disclosure is described below with reference to FIG. 1. FIG. 1 shows a schematic structural view of the optical lens assembly according to example 1 of the present disclosure.

As shown in FIG. 1, the optical lens assembly includes a first lens L1, a second lens L2, a third lens L3, a fourth lens L4, a fifth lens L5, and a sixth lens L6, which are sequentially arranged from an object side to an image side along an optical axis.

The first lens L1 is a biconcave lens having a negative refractive power, and both of an object-side surface S1 and an image-side surface S2 of the first lens L1 are concave surfaces.

The second lens L2 is a meniscus lens having a positive refractive power, an object-side surface S3 of the second lens L2 is a concave surface and an image-side surface S4 of the second lens L2 is a convex surface.

The third lens L3 is a biconvex lens having a positive refractive power, and both of an object-side surface S6 and an image-side surface S7 of the third lens L3 are convex surfaces.

The fourth lens L4 is a meniscus lens having a negative refractive power, an object-side surface S8 of the fourth lens L4 is a convex surface and an image-side surface S9 of the fourth lens L4 is a concave surface. The fifth lens L5 is a biconvex lens having a positive refractive power, and both of an object-side surface S9 and an image-side surface S10 of the fifth lens L5 are convex surfaces. Here, the fourth lens L4 and the fifth lens L5 are cemented together to form a cemented lens.

The sixth lens L6 is a meniscus lens having a negative refractive power, and the sixth lens as a whole is convex toward the object side. A paraxial area of an object-side surface S11 of the sixth lens L6 is convex, and the object-side surface S11 of the sixth lens L6 has at least one inflection point. A paraxial area of an image-side surface S12 of the sixth lens L6 is concave, and the image-side surface S12 of the sixth lens L6 has at least one inflection point.

Here, each of the first lens L1, the second lens L2 and the sixth lens L6 is an aspherical lens, and their respective object-side surfaces and image-side surfaces are aspherical.

Optionally, the optical lens assembly may further include an optical filter L7 having an object-side surface S13 and an image-side surface S14, and a protective lens L8 having an object-side surface S15 and an image-side surface S16. The optical filter L7 may be used to correct color deviations. The protective lens L8 may be used to protect an image sensing chip located on an imaging plane IMA. Light from an object sequentially passes through the respective surfaces S1 to S16 and is finally imaged on the imaging plane IMA.

In the optical lens assembly of the present example, a stop STO may be provided between the second lens L2 and the third lens L3 to improve imaging quality.

Table 1 shows radius of curvature R, thickness T, refractive index Nd and Abbe number Vd of each lens of the optical lens assembly in example 1, wherein the units for the radius of curvature R and the thickness T are millimeter (mm).

TABLE 1

| Surface No. | Radius of Curvature R | Thickness T | Refractive Index Nd | Abbe Number Vd |
|---|---|---|---|---|
| 1 | −17.2637 | 0.6503 | 1.586 | 61.124 |
| 2 | 4.1680 | 2.2320 | | |
| 3 | −6.5943 | 5.0517 | 1.586 | 61.124 |
| 4 | −5.2880 | −0.9755 | | |
| STO | Infinite | 1.0568 | | |
| 6 | 12.7718 | 4.7076 | 1.497 | 81.595 |
| 7 | −12.7718 | 2.6978 | | |
| 8 | 9.6479 | 1.1976 | 1.923 | 18.895 |
| 9 | 4.9888 | 4.4824 | 1.497 | 81.595 |
| 10 | −9.3487 | 0.6159 | | |
| 11 | 27.9069 | 2.8046 | 1.586 | 61.124 |
| 12 | 26.5754 | 0.2439 | | |
| 13 | Infinite | 0.5500 | 1.517 | 64.212 |
| 14 | Infinite | 0.2439 | | |
| 15 | Infinite | 0.4000 | 1.517 | 64.212 |
| 16 | Infinite | 1.0344 | | |
| IMA | Infinite | | | |

The example employs six lenses as an example. By properly distributing the refractive power and surface of each lens, the center thickness of each lens, and the air gap between the lenses, the lens assembly may have at least one of the beneficial effects of high resolution, large aperture, long focal length, low sensitivity, small CRA, and a central region with large angle resolution. The surface shape Z of each aspherical is defined by the following formula:

$$Z(h) = \frac{ch^2}{1 + \sqrt{1 - (k+1)c^2 h^2}} + Ah^4 + Bh^6 + Ch^8 + Dh^{10} + Eh^{12} \quad (1)$$

Where, Z is the sag — the axis-component of the displacement of the surface from the aspheric vertex, when the surface is at height h from the optical axis; c is a paraxial curvature of the aspheric, c=1/R (that is, the paraxial curvature c is reciprocal of the radius of curvature R in the above Table 1); K is a conic coefficient; A, B, C, D, E are high-order coefficients. Table 2 below shows the conic coefficient k and the high-order coefficients A. B. C. D and E applicable to aspheric surfaces S1-S4 and S11-S12 in example 1.

TABLE 2

| Surface No. | K | A | B | C | D | E |
|---|---|---|---|---|---|---|
| 1 | −85.9805 | −4.0807E−03 | 6.7759E−04 | −5.6625E−05 | 2.6617E−06 | −5.2994E−08 |
| 2 | −3.7280 | 3.1409E−03 | −3.5707E−04 | 2.1055E−04 | −3.2594E−05 | 2.1287E−06 |
| 3 | −1.7463 | −4.0791E−03 | −4.8664E−05 | −3.2665E−05 | 5.1597E−06 | −3.7506E−07 |
| 4 | 0.3097 | 2.2628E−04 | 2.2270E−05 | −1.0671E−06 | 1.6254E−07 | −3.2337E−09 |
| 11 | 32.1153 | −1.4390E−03 | −7.9356E−05 | 2.0611E−06 | −2.4114E−07 | 1.8972E−09 |
| 12 | 44.9449 | −2.2446E−03 | −2.6280E−04 | 9.8622E−06 | 1.3794E−07 | −1.1812E−08 |

Table 3 shows the total track length TTL of the optical lens assembly (i.e., the distance on the optical axis from a center of the object-side surface S1 of the first lens L1 to the imaging plane IMA), the total focal length F of the optical lens assembly, a maximum effective aperture radius D of the object-side surface S1 of the first lens L1 corresponding to a maximum field-of-view of the optical lens assembly, an image height H corresponding to the maximum field-of-view of the optical lens assembly, a focal length F4 of the fourth lens L4 and a focal length F3 of the third lens L3, a focal length F45 of the cemented lens composed of the fourth lens L4 and the fifth lens L5 and the maximum field-of-view FOV of the optical lens assembly in example 1.

TABLE 3

| | | | |
|---|---|---|---|
| TTL (mm) | 26.9933 | F3 (mm) | 13.6866 |
| F (mm) | 4.1250 | F45 (mm) | 15.8910 |
| D (mm) | 7.3310 | FOV (°) | 120.0000 |
| H (mm) | 6.8520 | | |
| F4 (mm) | −12.7705 | | |

In this example, the total track length TTL of the optical lens assembly and the total focal length F of the optical lens assembly satisfy TTL/F=6.5438; the maximum field-of-view FOV of the optical lens assembly, the maximum effective aperture radius D of the object-side surface S1 of the first lens L1 corresponding to the maximum field-of-view of the optical lens assembly and the image height H corresponding to the maximum field-of-view of the optical lens assembly satisfy D/H/FOV=0.0089; the maximum field-of-view FOV of the optical lens assembly, the total focal length F of the optical lens assembly and the image height H corresponding to the maximum field-of-view of the optical lens assembly satisfy (FOV×F)/H=72.2417; the focal length F4 of the fourth lens L4 and the focal length F3 of the third lens L3 satisfy |F4/F3|=0.9331; and the focal length F45 of the cemented lens composed of the fourth lens L4 and the fifth lens L5 and the total focal length F of the optical lens assembly satisfy F45/F=3.8524.

Example 2

Figure 2:
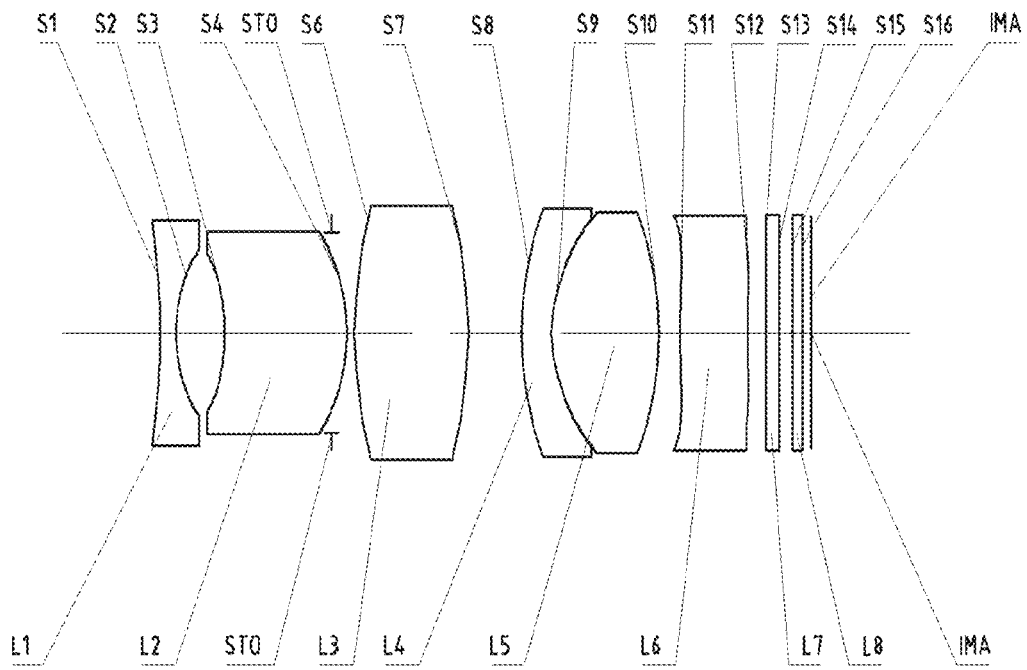
FIG. 2 is a schematic structural view illustrating an optical lens assembly according to example 2 of the present disclosure.

An optical lens assembly according to example 2 of the present disclosure is described below with reference to FIG. 2. In this example and the following examples, for the purpose of brevity, the description of parts similar to those in example 1 will be omitted. FIG. 2 is a schematic structural view of the optical lens assembly according to example 2 of the present disclosure.

As shown in FIG. 2, the optical lens assembly includes a first lens L1, a second lens L2, a third lens L3, a fourth lens L4, a fifth lens L5, and a sixth lens L6, which are sequentially arranged from an object side to an image side along an optical axis.

The first lens L1 is a biconcave lens having a negative refractive power, and both of an object-side surface S1 and an image-side surface S2 of the first lens L1 are concave surfaces.

The second lens L2 is a meniscus lens having a positive refractive power, an object-side surface S3 of the second lens L2 is a concave surface and an image-side surface S4 of the second lens L2 is a convex surface.

The third lens L3 is a biconvex lens having a positive refractive power, and both of an object-side surface S6 and an image-side surface S7 of the third lens L3 are convex surfaces.

The fourth lens L4 is a meniscus lens having a negative refractive power, an object-side surface S8 of the fourth lens L4 is a convex surface and an image-side surface S9 of the fourth lens L4 is a concave surface. The fifth lens L5 is a biconvex lens having a positive refractive power, and both of an object-side surface S9 and an image-side surface S10 of the fifth lens L5 are convex surfaces. Here, the fourth lens L4 and the fifth lens L5 are cemented together to form a cemented lens.

The sixth lens L6 is a meniscus lens having a negative refractive power, and the sixth lens as a whole is convex toward the object side. A paraxial area of an object-side surface S11 of the sixth lens L6 is convex, and the object-side surface S11 of the sixth lens L6 has at least one inflection point. A paraxial area of an image-side surface S12 of the sixth lens L6 is concave, and the image-side surface S12 of the sixth lens L6 has at least an inflection point.

Here, each of the first lens L1, the second lens L2 and the sixth lens L6 is an aspherical lens, and their respective object-side surfaces and image-side surfaces are aspherical.

Optionally, the optical lens assembly may further include an optical filter L7 having an object-side surface S13 and an image-side surface S14, and a protective lens L8 having an object-side surface S15 and an image-side surface S16. The optical filter L7 may be used to correct color deviations. The protective lens L8 may be used to protect an image sensing chip located on an imaging plane IMA. Light from an object sequentially passes through the respective surfaces S1 to S16 and is finally imaged on the imaging plane IMA.

In the optical lens assembly of the present example, a stop STO may be provided between the second lens L2 and the third lens L3 to improve imaging quality.

Table 4 shows radius of curvature R, thickness T, refractive index Nd and Abbe number Vd of each lens of the optical lens assembly in example 2, wherein the units for the radius of curvature R and the thickness T are millimeter (mm). Table 5 below shows the conic coefficient K and the high-order coefficients A, B, C, D and E applicable to aspheric lens surfaces S1-S4 and S11-S12 in example 2. Table 6 shows the total track length TTL of the optical lens assembly, the total focal length F of the optical lens assembly, a maximum effective aperture radius D of the object-side surface S1 of the first lens L1 corresponding to a maximum field-of-view of the optical lens assembly, an image height H corresponding to the maximum field-of-view of the optical lens assembly, a focal length F4 of the fourth lens L4 and a focal length F3 of the third lens L3, a focal length F45 of the cemented lens composed of the fourth lens L4 and the fifth lens L5 and the maximum field-of-view FOV of the optical lens assembly in example 2.

TABLE 4

| Surface No. | Radius of Curvature R | Thickness T | Refractive Index Nd | Abbe Number Vd |
|---|---|---|---|---|
| 1 | −17.6418 | 0.6360 | 1.586 | 61.124 |
| 2 | 4.0791 | 2.1941 | | |
| 3 | −6.4120 | 4.9752 | 1.586 | 61.124 |
| 4 | −5.2043 | −0.9589 | | |
| STO | Infinite | 1.0388 | | |
| 6 | 12.5915 | 4.6803 | 1.497 | 81.595 |
| 7 | −12.5910 | 2.5505 | | |
| 8 | 9.4985 | 1.2055 | 1.923 | 18.895 |
| 9 | 4.9207 | 4.4279 | 1.497 | 81.595 |
| 10 | −8.8490 | 0.6054 | | |
| 11 | 28.3542 | 2.7417 | 1.586 | 61.124 |
| 12 | 25.8789 | 0.2397 | | |

TABLE 4-continued

| Surface No. | Radius of Curvature R | Thickness T | Refractive Index Nd | Abbe Number Vd |
|---|---|---|---|---|
| 13 | Infinite | 0.5500 | 1.517 | 64.212 |
| 14 | Infinite | 0.2397 | | |
| 15 | Infinite | 0.4000 | 1.517 | 64.212 |
| 16 | Infinite | 1.0291 | | |
| IMA | Infinite | | | |

TABLE 5

| Surface No. | K | A | B | C | D | E |
|---|---|---|---|---|---|---|
| 1 | −94.1537 | −4.3543E−03 | 7.3847E−04 | −6.3839E−05 | 3.1021E−06 | −6.3632E−08 |
| 2 | −4.0044 | 3.1143E−03 | −4.5045E−04 | 2.4379E−04 | −3.7692E−05 | 2.4259E−06 |
| 3 | −1.5832 | −4.2953E−03 | −6.6743E−05 | −3.7501E−05 | 6.3967E−06 | −5.2183E−07 |
| 4 | 0.2833 | 2.4162E−04 | 2.4097E−05 | −1.1840E−06 | 1.9074E−07 | −4.0434E−09 |
| 11 | 44.4138 | −1.6085E−03 | −8.8171E−05 | 2.4434E−06 | −2.7610E−07 | 1.3881E−09 |
| 12 | 66.7133 | −2.3145E−03 | −2.8587E−04 | 1.0778E−05 | 1.5796E−07 | −1.3515E−08 |

TABLE 6

| TTL (mm) | 26.5550 | F3 (mm) | 13.4665 |
|---|---|---|---|
| F (mm) | 4.0200 | F45 (mm) | 15.2420 |
| D (mm) | 7.2128 | FOV (°) | 120.0000 |
| H (mm) | 6.8900 | | |
| F4 (mm) | −12.5357 | | |

In this example, the total track length TTL of the optical lens assembly and the total focal length F of the optical lens assembly satisfy TTL/F=6.6057; the maximum field-of-view FOV of the optical lens assembly, the maximum effective aperture radius D of the object-side surface S1 of the first lens L1 corresponding to the maximum field-of-view of the optical lens assembly and the image height H corresponding to the maximum field-of-view of the optical lens assembly satisfy D/H/FOV=0.0087; the maximum field-of-view FOV of the optical lens assembly, the total focal length F of the optical lens assembly and the image height H corresponding to the maximum field-of-view of the optical lens assembly satisfy (FOV×F)/H=70.0145; the focal length F4 of the fourth lens L4 and the focal length F3 of the third lens L3 satisfy |F4/F3|=0.9309; and the focal length F45 of the cemented lens composed of the fourth lens L4 and the fifth lens L5 and the total focal length F of the optical lens assembly satisfy F45/F=3.7915.

Example 3

Figure 3:
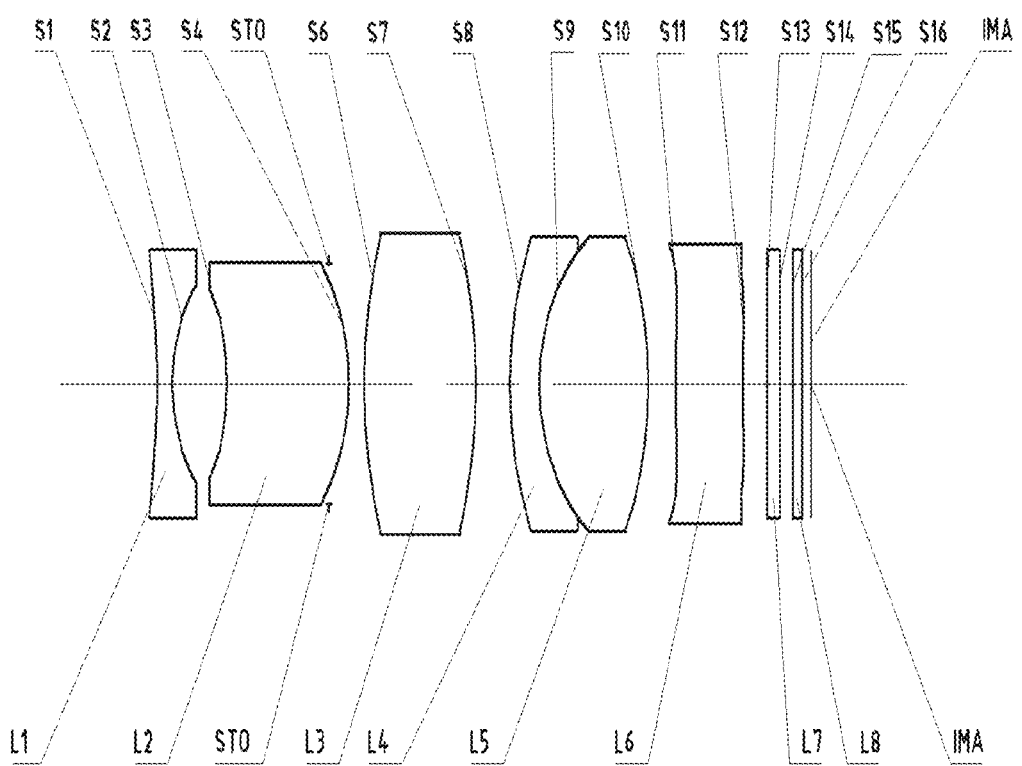
FIG. 3 is a schematic structural view illustrating an optical lens assembly according to example 3 of the present disclosure.

An optical lens assembly according to example 3 of the present disclosure is described below with reference to FIG. 3. In this example and the following examples, for the purpose of brevity, the description of parts similar to those in example 1 will be omitted. FIG. 3 is a schematic structural view of the optical lens assembly according to example 3 of the present disclosure.

As shown in FIG. 3, the optical lens assembly includes a first lens L1, a second lens L2, a third lens L3, a fourth lens L4, a fifth lens L5, and a sixth lens L6, which are sequentially arranged from an object side to an image side along an optical axis.

The first lens L1 is a biconcave lens having a negative refractive power, and both of an object-side surface S1 and an image-side surface S2 of the first lens L1 are concave surfaces.

The second lens L2 is a meniscus lens having a positive refractive power, an object-side surface S3 of the second lens L2 is a concave surface and an image-side surface S4 of the second lens L2 is a convex surface.

The third lens L3 is a biconvex lens having a positive refractive power, and both of an object-side surface S6 and an image-side surface S7 of the third lens L3 are convex surfaces.

The fourth lens L4 is a meniscus lens having a negative refractive power, an object-side surface S8 of the fourth lens L4 is a convex surface and an image-side surface S9 of the fourth lens L4 is a concave surface. The fifth lens L5 is a biconvex lens having a positive refractive power, and both of an object-side surface S9 and an image-side surface S10 of the fifth lens L5 are convex surfaces. Herein, the fourth lens L4 and the fifth lens L5 are cemented together to form a cemented lens.

The sixth lens L6 is a meniscus lens having a negative refractive power, and the sixth lens as a whole is convex toward the object side. A paraxial area of an object-side surface S11 of the sixth lens L6 is convex, and the object-side surface S11 of the sixth lens L6 has at least one inflection point. A paraxial area of an image-side surface S12 of the sixth lens L6 is concave, and the image-side surface S12 of the sixth lens L6 has at least one inflection point.

Here, each of the first lens L1, the second lens L2 and the sixth lens L6 is an aspherical lens, and their respective object-side surfaces and image-side surfaces are aspherical.

Optionally, the optical lens assembly may further include an optical filter L7 having an object-side surface S13 and an image-side surface S14, and a protective lens L8 having an object-side surface S15 and an image-side surface S16. The optical filter L7 may be used to correct color deviations. The protective lens L8 may be used to protect an image sensing chip located on an imaging plane IMA. Light from an object sequentially passes through the respective surfaces S1 to S16 and is finally imaged on the imaging plane IMA.

In the optical lens assembly of the present example, a stop STO may be provided between the second lens L2 and the third lens L3 to improve imaging quality.

Table 7 shows radius of curvature R, thickness T, refractive index Nd and Abbe number Vd of each lens of the optical lens assembly in example 3, wherein the units for the radius of curvature R and the thickness T are millimeter (mm). Table 8 below shows the conic coefficient k and the high-order coefficients A. B. C. D and E applicable to aspheric lens surfaces S1-S4 and S11-S12 in example 3. Table 9 shows the total track length TTL of the optical lens assembly, the total focal length F of the optical lens assembly, a maximum effective aperture radius D of the object-side surface S1 of the first lens L1 corresponding to a maximum field-of-view of the optical lens assembly, an image height H corresponding to the maximum field-of-view of the optical lens assembly, a focal length F4 of the fourth lens L4 and a focal length F3 of the third lens L3, a focal length F45 of the cemented lens composed of the fourth lens L4 and the fifth lens L5 and the maximum field-of-view FOV of the optical lens assembly in example 3.

TABLE 7

| Surface No. | Radius of Curvature R | Thickness T | Refractive Index Nd | Abbe Number Vd |
|---|---|---|---|---|
| 1 | −18.3741 | 0.6600 | 1.586 | 61.124 |
| 2 | 4.2454 | 2.2841 | | |
| 3 | −6.6745 | 5.1784 | 1.586 | 61.124 |
| 4 | −5.4165 | −0.9982 | | |
| STO | Infinite | 1.0814 | | |
| 6 | 13.1093 | 4.8158 | 1.497 | 81.595 |
| 7 | −13.1089 | 2.6777 | | |
| 8 | 9.9011 | 1.2538 | 1.923 | 18.895 |
| 9 | 5.1180 | 4.6260 | 1.497 | 81.595 |
| 10 | −9.2803 | 0.6348 | | |
| 11 | 29.4981 | 2.8531 | 1.586 | 61.124 |
| 12 | 27.0356 | 0.2496 | | |
| 13 | Infinite | 0.5500 | 1.517 | 64.212 |
| 14 | Infinite | 0.2496 | | |
| 15 | Infinite | 0.4000 | 1.517 | 64.212 |
| 16 | Infinite | 1.0958 | | |
| IMA | Infinite | | | |

TABLE 8

| Surface No. | K | A | B | C | D | E |
|---|---|---|---|---|---|---|
| 1 | −123.7766 | −3.8612E−03 | 6.0336E−04 | −4.8185E−05 | 2.1621E−06 | −4.0978E−08 |
| 2 | −3.1250 | 2.8404E−03 | −3.6549E−04 | 1.8363E−04 | −2.6161E−05 | 1.5529E−06 |
| 3 | −1.9090 | −3.7887E−03 | −5.0936E−05 | −2.8477E−05 | 4.3857E−06 | −3.2595E−07 |
| 4 | 0.3091 | 2.1251E−04 | 1.9762E−05 | −9.0678E−07 | 1.3386E−07 | −2.6056E−09 |
| 11 | 43.4646 | −1.4199E−03 | −7.0041E−05 | 1.8820E−06 | −1.9410E−07 | 4.3171E−10 |
| 12 | 67.5952 | −2.0624E−03 | −2.3377E−04 | 8.1366E−06 | 1.0896E−07 | −8.8197E−09 |

TABLE 9

| TTL (mm) | 27.6120 | F3 (mm) | 14.0095 |
|---|---|---|---|
| F (mm) | 4.2000 | F45 (mm) | 16.0015 |
| D (mm) | 7.5224 | FOV (°) | 120.0000 |
| H (mm) | 7.1640 | | |
| F4 (mm) | −12.9991 | | |

In this example, the total track length TTL of the optical lens assembly and the total focal length F of the optical lens assembly satisfy TTL/F=6.5743; the maximum field-of-view FOV of the optical lens assembly, the maximum effective aperture radius D of the object-side surface S1 of the first lens L1 corresponding to the maximum field-of-view of the optical lens assembly and the image height H corresponding to the maximum field-of-view of the optical lens assembly satisfy D/H/FOV=0.0088; the maximum field-of-view FOV of the optical lens assembly, the total focal length F of the optical lens assembly and the image height H corresponding to the maximum field-of-view of the optical lens assembly satisfy (FOV×F)/H=70.3518; the focal length F4 of the fourth lens L4 and the focal length F3 of the third lens L3 satisfy |F4/F3|=0.9279; and the focal length F45 of the cemented lens composed of the fourth lens L4 and the fifth lens L5 and the total focal length F of the optical lens assembly satisfy F45/F=3.8099.

In view of the above, examples 1 to 3 respectively satisfy the relationship shown in Table 10 below.

TABLE 10

| Conditional Expression\Embodiment | 1 | 2 | 3 |
|---|---|---|---|
| TTL/F | 6.5438 | 6.6057 | 6.5743 |
| D/H/FOV | 0.0089 | 0.0087 | 0.0088 |
| (FOV*F)/H | 72.2417 | 70.0145 | 70.3518 |
| |F4/F3| | 0.9331 | 0.9309 | 0.9279 |
| F45/F | 3.8524 | 3.7915 | 3.8099 |

The present disclosure further provides an imaging device that can include an optical lens assembly according to the above-described embodiments of the present disclosure and an imaging element for converting an optical image formed by the optical lens assembly into an electrical signal. The imaging element may be a Charge-Coupled Device element (CCD) or a Complementary Metal-Oxide Semiconductor element (CMOS). The imaging device may be a stand-alone imaging device such as a range detection camera, or an imaging module integrated on a device such as a range detection device.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising: a first lens, a second lens, a third lens, a fourth lens, a fifth lens and a sixth lens, which are sequentially arranged from an object side of the optical lens assembly to an image side of the optical lens assembly along an optical axis of the optical lens assembly, wherein, the first lens has a negative refractive power, and both of an object-side surface and an image-side surface of the first lens are concave surfaces;

the second lens has a positive refractive power, an object-side surface of the second lens is a concave surface and an image-side surface of the second lens is a convex surface;

the third lens has a positive refractive power, and both of an object-side surface and an image-side surface of the third lens are convex surfaces;

the fourth lens has a negative refractive power, an object-side surface of the fourth lens is a convex surface and an image-side surface of the fourth lens is a concave surface;

the fifth lens has a positive refractive power, and both of an object-side surface and an image-side surface of the fifth lens are convex surfaces; and the sixth lens has a negative refractive power.

2. The optical lens assembly according to claim 1, wherein a paraxial area of an object-side surface of the sixth lens is convex, and the object-side surface of the sixth lens has at least one inflection point.

3. The optical lens assembly according to claim 1, wherein a paraxial area of an image-side surface of the sixth lens is concave, and the image-side surface of the sixth lens has at least one inflection point.

4. The optical lens assembly according to claim 1, wherein the fourth lens and the fifth lens are cemented together to form a cemented lens.

5. The optical lens assembly according to claim 1, wherein the optical lens assembly satisfies: TTL/F≤7.5, where TTL is a total track length of the optical lens assembly and F is a total focal length of the optical lens assembly.

6. The optical lens assembly according to claim 1, wherein the optical lens assembly satisfies: D/H/FOV≤0.02, where FOV is a maximum field-of-view of the optical lens assembly, D is a maximum effective aperture radius of the object-side surface of the first lens corresponding to the maximum field-of-view of the optical lens assembly and H is an image height corresponding to the maximum field-of-view of the optical lens assembly.

7. The optical lens assembly according to claim 1, wherein the optical lens assembly satisfies: (FOV×F)/H≥60, where FOV is a maximum field-of-view of the optical lens assembly, F is a total focal length of the optical lens assembly and H is an image height corresponding to the maximum field-of-view of the optical lens assembly.

8. The optical lens assembly according to claim 1, wherein the optical lens assembly satisfies: |F4/F3|≤2, where F4 is a focal length of the fourth lens and F3 is a focal length of the third lens.

9. The optical lens assembly according to claim 1, wherein the optical lens assembly satisfies: 2≤F45/F≤5, where F45 is a combined focal length of the fourth lens and the fifth lens and F is a total focal length of the optical lens assembly.

10. An imaging device, comprising the optical lens assembly of claim 1 and an imaging element for converting an optical image formed by the optical lens assembly into an electrical signal.

11. An optical lens assembly, comprising: a first lens, a second lens, a third lens, a fourth lens, a fifth lens and a sixth lens, which are sequentially arranged from an object side of the optical lens assembly to an image side of the optical lens assembly along an optical axis of the optical lens assembly, wherein, the first lens has a negative refractive power;

the third lens has a positive refractive power;

an object-side surface of the second lens is a concave surface and an image-side surface of the second lens is a convex surface;

an object-side surface of the fourth lens is a convex surface;

the fourth lens and the fifth lens are cemented together to form a cemented lens; and the optical lens assembly satisfies: TTL/F≤7.5; and (FOV×F)/H≥60, where TTL is a total track length of the optical lens assembly, F is a total focal length of the optical lens assembly, FOV is a maximum field-of-view of the optical lens assembly, and H is an image height corresponding to the maximum field-of-view of the optical lens assembly.

12. The optical lens assembly according to claim 11, wherein both of an object-side surface and an image-side surface of the first lens are concave surfaces.

13. The optical lens assembly according to claim 11, wherein both of an object-side surface and an image-side surface of the third lens are convex surfaces.

14. The optical lens assembly according to claim 11, an image-side surface of the fourth lens is a concave surface.

15. The optical lens assembly according to claim 11, wherein both of an object-side surface and an image-side surface of the fifth lens are convex surfaces.

16. The optical lens assembly according to claim 11, wherein a paraxial area of an object-side surface of the sixth lens is convex, and the object-side surface of the sixth lens has at least one inflection point.

17. The optical lens assembly according to claim 11, wherein a paraxial area of an image-side surface of the sixth lens is concave, and the image-side surface of the sixth lens has at least one inflection point.

18. The optical lens assembly according to claim 11, wherein the optical lens assembly satisfies: D/H/FOV≤0.02, where FOV is a maximum field-of-view of the optical lens assembly, D is a maximum effective aperture radius of the object-side surface of the first lens corresponding to the maximum field-of-view of the optical lens assembly and H is an image height corresponding to the maximum field-of-view of the optical lens assembly.

19. The optical lens assembly according to claim 11, wherein the optical lens assembly satisfies: |F4/F3|≤2, where F4 is a focal length of the fourth lens and F3 is a focal length of the third lens.

20. The optical lens assembly according to claim 11, wherein the optical lens assembly satisfies: 2≤F45/F≤5, where F45 is a combined focal length of the fourth lens and the fifth lens and F is the total focal length of the optical lens assembly.

\* \* \* \* \*